United States Patent [19]
Elsner

[11] 3,861,063
[45] Jan. 21, 1975

[54] PROGRAMMABLE QUESTION AND ANSWER GAME

[76] Inventor: Peter Elsner, Forstennieder Allee 227, 8000 Munich 71, Germany

[22] Filed: Feb. 15, 1973

[21] Appl. No.: 333,126

[30] Foreign Application Priority Data
Feb. 22, 1972 Germany............................ 2208352

[52] U.S. Cl................................ 35/9 R, G09b/7/02
[58] Field of Search....................... 35/9 R, 9 B, 9 D

[56] References Cited
UNITED STATES PATENTS
2,965,975  12/1960  Briggs................................... 35/9 B
3,546,791  12/1970  Koos et al. ............................ 35/9 B

FOREIGN PATENTS OR APPLICATIONS
39,229    5/1887  Germany
836,454   4/1952  Germany
937,873   1/1956  Germany
1,161,189 1/1964  Germany
1,233,309 1/1967  Germany
1,269,929 6/1968  Germany

Primary Examiner—Wm. H. Grieb
Attorney, Agent, or Firm—Wolfgang G. Fasse

[57] ABSTRACT

The present question and answer game is programmable by means of question cards which carry a coded answer in a marking area of the card. The coded answer is either invisible or without meaning to the player. The clear question also appears on the card. An evaluating apparatus with one or two lockable receptacles for retaining correctly answered question cards or for retaining correctly answered question cards and incorrectly answered cards separately, also includes means for comparing the question card with an answer means to produce the retaining function. An answer may be given by inserting answer cards into the evaluating apparatus or by actuating answer keys which may be arranged as part of the evaluating apparatus. The retained question cards not only give a count of the number of correctly answered questions, but also show which questions were correctly answered. The game also includes means for registering a wrong answer, for example, by collecting the incorrectly answered question cards in a separate receptacle or by collecting a special unlocking card.

15 Claims, 8 Drawing Figures

PROGRAMMABLE QUESTION AND ANSWER GAME

BACKGROUND OF THE INVENTION:

The present invention relates to a programmable question and answer game, wherein the questions may be programmed at random. The questions are to be answered by selecting or combining a proper answer.

German Pat. No. 39,229 of May 5, 1887 discloses a question and answer game comprising electrical control devices and exchangeable question and answer sheets. For each question and for each answer an electrical contact is provided whereby the correlation between a question and an answer is accomplished by an electrically conducting connection between a question contact and the respective answer contact. Two contact pins with flexible electrical conductors are provided for the use of the player. The flexible electrical conductors are part of an open electrical circuit including a voltage source and an optical and/or acoustical signalling device. If the player touches a question contact with one of the contact pins and the correct answer contact with the other contact pin the circuit will be closed through the signalling device for indicating the correct answer optically and/or acoustically. No signal will be given when the answer is incorrect.

Games of the above type do not provide a record as to which questions have been answered correctly or incorrectly. In other words, students which use these devices without supervision cannot show proof of any success. Further, these devices do not encourage mental work because the rigid spacial coordination between question and correct answer enables the student after he has gained some experience to eliminate the thinking even when the question and answer sheet is exchanged. Another disadvantage is seen in that the student may ascertain the correct answer by a trial and error approach due to the limited number of answering possibilities. Besides, the optical and/or acoustical signalling device does not provide an actual control because it provides a signal if merely the two contact pins touch each other.

German Pat. Publications Nos. 1,233,309 of Jan. 26, 1967 and 1,269,929 of June 6, 1968 disclose question and answer games with mechanical control devices. The questions on an exchangeable sheet appear together with a plurality of possible answers "a, b, c, d," and so forth in a window of a rotatable disk which is rotatably connected with a perforated dial comprising answer holes "a, b, c, d," and so forth. The player must select one of the possible answers appearing in the question window by inserting a pin into the hole corresponding to the selected answer "a, or b, or c" and so forth. Thus, the player may turn the perforated dial by one step. Means are provided which assure that in case of a correct answer the rotatable disk is also rotated by one step simultaneously with the perforated dial, whereby the next question appears in the question window. If the selected answer was incorrect, only the perforated dial will be turned by one step. A window in the perforated dial indicates how often the dial was advanced in response to a wrong answer without entraining the rotatable disk whereby the number of wrong answers is counted. This type of apparatus also makes it possible to solve calculating problems having an answer comprising several digits whereby the stepping or turning of the dial takes up several steps until the next question appears in the question window. In this instance the turning of the dial is possible only by inserting a pin sequentially into the holes which correspond to the first, second and so forth digit of the correct answer number.

The just described question and answer game provides a certain control of the student, however, that control is incomplete because only the number of wrong answers is counted without any proof as to which specific question was answered wrong and which one was answered correctly. Here again, it is not possible to ascertain without supervision whether a student requires improvement or aid for certain problems. Further, the student has no possibility of selecting the questions because their sequence is rigidly fixed. Thus, if the student cannot answer a particular question, he must either try to solve that question by trial and error or he must ask a supervising person for aid. Here again, finding of the correct answer is possible by the trial and error approach even if the answer contains several digits because an answer number of $i$-digits requires only $i \times 10$ trials although there are $10^i$ possible solutions. Besides, the number of questions is limited due to the size of the rotatable disk. Accordingly, the question sheet must be exchanged frequently by a supervising person.

German Pat. No. 937,873 of Jan. 19, 1956 discloses a further mechanically operating question and answer game including a control device for dispensing items of reward. This apparatus comprises a box with an apertured cover plate and a drawer for the reward items. A two part exchangeable cover sheet is stretched over the apertured cover plate. One portion of the cover sheet comprises question zones and the other portion comprises apertured zones or areas with correct and wrong answers. In other words, the sheet comprises always more answers than questions. The player has to place a plug into the correct answer area for each question. The plug actuates a mechanical interlocking device inside the box, whereby the drawer with the reward items is unlocked only in response to a predetermined plug combination. Thus, only when the player has correctly answered a predetermined number of posed questions in their entirety will the reward be given.

The plug combination provides a record showing which of the questions were answered incorrectly and which of the questions were answered correctly. However, the student working without supervision does not know whether he answered the individual question correctly or incorrectly which means that the continuous control is lacking and that the student cannot derive the sense of success from his work. If, after all the questions have been answered, the intended success does not occur the player must either again answer all questions possibly also with a negative result or he has to ask a supervising person for help since he does not known which of the questions has been answered wrongly. Besides, older children are able to open the drawer without solving any particular problems if they have memorized the plug combination necessary for the unlocking of the drawer. Another drawback is seen in that the number of questions is rather limited so that the problem sheet must be frequently exchanged.

German Pat. No. 836,454 of Apr. 15, 1952 discloses a question and answer game with a housing having a question window and a coverable answer window as well as at least one data carrier enclosed in the housing and manually indexable. The data carrier is exchangeable and the questions and answers are recorded on the data carrier in such a manner that at any one instance but one question appears in the question window and the respective answer in the answer window. This type of device does not provide any control whatsoever and it also does not provide proof whether and which questions have been answered correctly or incorrectly and whether any mental work at all has been done. Games of this type are suitable only for a teaching purpose.

German Pat. Publication No. 1,161,189 of Jan. 9, 1964 discloses a question and answer game in the nature of a so called puzzle game comprising a board divided into answer areas and a number of tablets provided with questions, whereby the tablets may be constructed as change frames with exchangeable question cards. It is the player's task to deposit the question tablets on the correct answer areas or fields of the board, whereby the individual tablets will form a unit if the answers have been correct. Each question tablet is provided along both of its longitudinal sides with individual profiles which differ from the profiles of the other tablets and may, for example, comprise differing serations whereby the serations of adjacent question tablets match with each other only when the correct answer is given. Accordingly, the question tablets will form only then a unitary structure when correct answers are given, whereby the answers are continuously controlled.

The disadvantage of the just described prior art game is similar as that encountered in connection with crossword puzzles where the individual question is not controlled but only the total of several questions. In other words, this device does not provide any continuous control independently of the question sequence. The student may elect the questions only to a limited extent depending on the combination. If he is unable to answer a particular question, there is no possibility of control with regard to the next question. The more questions that remain unanswered, the fewer control possibilities will remain so that eventually the student will have to ask for the aid of a supervising person. Furthermore, the board limits the number of answers whereby, especially toward the remaining few answers it is possible to apply a trial and error method similarly to a jig saw puzzle. Another basic disadvantage of any game of the puzzle type is the lack of a signalling device which could convey the sense of success, especially for younger children.

In addition to the foregoing question and answer games, there are known in the art sophisticated teaching automats which also operate in accordance with the question-answer principle. The German magazine "Funktechnik," 1968, Number 15, pages 560 to 562, describes such a teaching automat comprising a two track tape recorder and a movie or slide projector which are combined into a system by means of an electrical control unit. Thus, the system displays the subject matter of a lesson in an optical as well as in an acoustical manner. One track of the sound tape comprises the accompanying text of the lesson, the subject matter of which is also shown by the movie or slide projector. The same applies to the questions which conclude each lesson step. The second track on the sound tape comprises the control information for the image or frame change as well as the answer information for each posed question. The answers which the student supplies by means of an answer keyboard in the control device are compared with the answer information on the sound tape whereby the image or frame change is controlled. In other words, the individual lesson steps are controlled by the answers. Although these teaching automats permit a continuous and complete control or supervision of the student, they are rather expensive and therefore not suitable for everyday use in the home.

In more simpler teaching automats the subject matter to be taught is displayed optically in the form of text or drawings on a paper tape. Two electric motors move the optically displayed teaching program back and forth past a viewing window. The program tape comprises in addition to the subject matter taught an answer information for each posed question. The student controls the individual lesson steps by means of a keyboard and he answers the questions posed. The answers are automatically compared with the answer information on the program tape and are thus continuously controlled. However, even this simple teaching automat is not suitable for everyday home use.

OBJECTS OF THE INVENTION

In view of the above, it is the aim of the invention to achieve the following objects singly or in combination:

to remove the drawbacks of the above outlined prior art, more specifically to provide a reasonably priced question and answer game which is suitable also for younger children;

to provide a question and answer game which assures a continuous supervision individually for each question and independently of the question sequence;

to provide a question and answer game which is programmable without limitation and which permits to tell after the completion of a test which answers were correct and which answers were incorrect, while simultaneously providing the student with a sucess satisfaction;

to provide a complete count of incorrect and correct answers, while permitting an unsupervised instruction and to avoid a rigid sequence of questions;

to provide a question and answer game wherein the questions may be programmed on program carriers, such as data cards, which carry the questions in one representation which is clear to the student and in a coded representation the answer which is invisible to the student or which does not signify a meaning to the student;

to provide means for collecting the correctly answered question cards and preferably also for collecting in a separate receptacle the cards which have been answered incorrectly or special cards which represent an incorrectly answered question; and to provide a question and answer game where the answers may be given by simply inserting an answer card or a number of answer card elements into the apparatus which will then compare the answer card or cards with the respective question card, or wherein the answer may be given by simply operating a number of keys on a keyboard.

SUMMARY OF THE INVENTION

According to the invention there is provided a programmable question and answer game including an evaluating device for random questions with an answer having up to $i$-digits and further including a lockable storage receptacle as well as a scanning device for a programmable question data carrier and a device for answering the question whereby the correlation between a question and an answer is accomplished by at least $i \times n$ markings on the question data carrier. The markings do not signify any meaning to the player or are invisible. However, the markings are capable of evaluation by said scanning device in such a manner that the question data carrier is collected into the lockable storage receptacle by the evaluating device in response to a correct answer, whereas an error symbol is stored for each incorrect answer, whereby the question data carrier itself may represent the error symbol provided it is stored in a different receptacle.

The device for answering the question comprises according to one embodiment of the invention a second scanning device in the evaluating device for scanning up to $i$ programmable answer data carriers whereby the correlation between the question data carrier and the respective answer data carrier or the correct combination of $i$ answer data carrier elements is accomplished by at least $n$ markings on each of the $i$ answer data carriers or carrier elements and by at least $i \times n$ markings on the question data carrier. Here again, the markings are either invisible or do not signify any meaning to the player. However, the markings may be scanned by the two scanning devices in such a manner that the evaluating apparatus collects the question data carrier into the lockable receptacle in response to a correct answer, whereas an error symbol is stored in response to each wrong answer and instead of the question data carrier.

According to the invention there is provided a further embodiment of the question-answering device comprising an answering keyboard including up to $2^n$ answering symbols, whereby the correlation between the question data carrier and the correct answer key combination signifying an answer with $i$-digits is accomplished by at least $i \times n$ markings on the question data carrier which again does not signify any meaning to the player or which is invisible to the player. However, these markings can be evaluated from the scanning device in such a manner that the evaluating device collects the question data carrier into the lockable storage receptacle in response to a correct answer. Here again, an error signal is stored in response to each wrong answer. The error symbol may be a special separate data carrier which is inserted to replace the question data carrier or means may be provided for collecting the question data carrier which has been answered incorrectly in a separate storage receptacle.

After the conclusion of a game or set of questions, a complete record of the performance is available because the correctly answered question data carriers are separated from the incorrectly answered data carriers and may thus be separately counted.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figure 1:
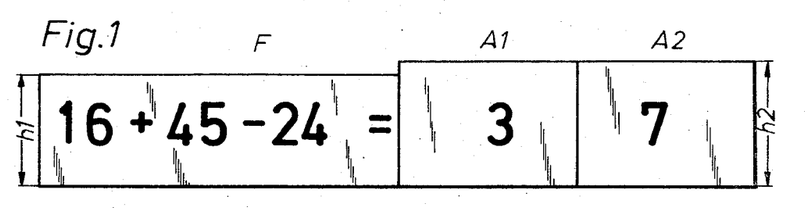
FIG. 1 illustrates a front view of a question data carrier and of two answer data carrier elements.
Figure 2:
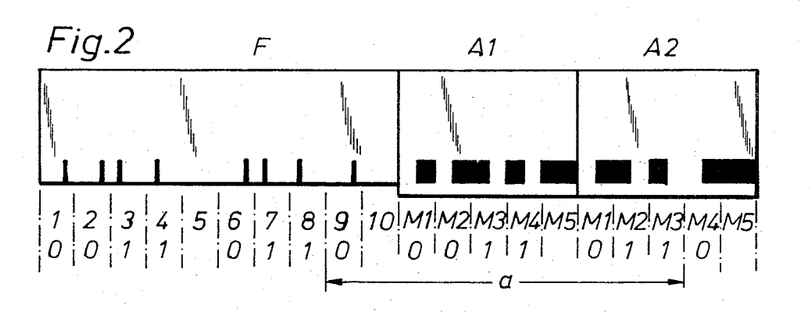
FIG. 2 illustrates the rear view of the question data carrier and of the answer data carriers according to FIG. 1.

A first embodiment according to the invention is illustrated in FIGS. 1 to 6 which employs cards a question data carriers and as answer data carriers, whereby both types of cards are provided with optical markings. FIGS. 1 and 2 illustrate a set of the type of cards employed according to the invention, whereby in the example the answer to the question may be expressed as a two digit answer. FIG. 1 shows the front view of a question card F as well as the front view of two answer card elements A1 and A2. A simple calculating example is involved. The question cards F have a height h1 which is slightly smaller than the height h2 of the answer cards. The cards may, for example, be printed and the question and answer symbols are visible and understandable.

FIG. 2 illustrates the back of the question and answer cards according to the invention. Both types of cards are provided with coded markings, preferably binary coded markings representing an answer corresponding to the question on the front surface of the question card F. These coded markings are not understandable to the student. These coded markings may be evaluated by the present apparatus in an optical manner. Each answer card A1, A2 carries four marking areas M1, M2, M3, M4 signifying a binary 0 by a light-dark marking or a binary 1 by a dark-light marking. Thus, these markings provide for each answer digit $2^4 = 16$ different answers, for example, the numbers 0 and 1 to 9 as well as random special markings such as "+," "—," ":," "x," "$x^2$," and so forth. For an answer comprising $i$-digits it is thus possible to provide $2^4 \times i$ possible answer combinations. In the illustrated example where the answer has two digits ($i = 2$), the number of answer combinations is $2^8 = 256$. The answer cards are further provided with a fifth marking area M5, carrying a dark marking which compensates for any tolerances which might be inherent in the evaluating apparatus.

The four marking positions of the $i$-number of answer cards which form in the example an 8 digit binary code are also arranged on the question cards in a manner true to their digital position as well as true to size. As a result, all marking areas of the question cards have the same spacing "$a$" to the corresponding markings on the answer cards. In order to simplify the scanning procedure and also for compensating card tolerances, it is advantageous to make the dark markings on the question cards narrower than the respective dark markings on the answer cards. The marking positions 5 and 10 on the question card F which correspond to the neutral marking positions M5 of the two answer cards are provided with light markings.

The just described markings on the question and answer cards have the advantage that a continuous check by the evaluating apparatus to ascertain whether or not an answer was correct may be accomplished by simply comparing the binary code of the question card with the binary code established by the number $i$ of answering cards. For this purpose the evaluating apparatus shown in FIG. 3 comprises two scanning devices OF and OA. The question and answer cards are moved past these two scanning devices in sequence and without any interruption between adjacent cards. The scanning devices measure the difference in brightness UF-UA between the question and answer markings, whereby this difference will signify, for example, a correct answer if the difference is positive whereas a negative difference will result for at least one marking area when the answer is incorrect.

Figure 3:
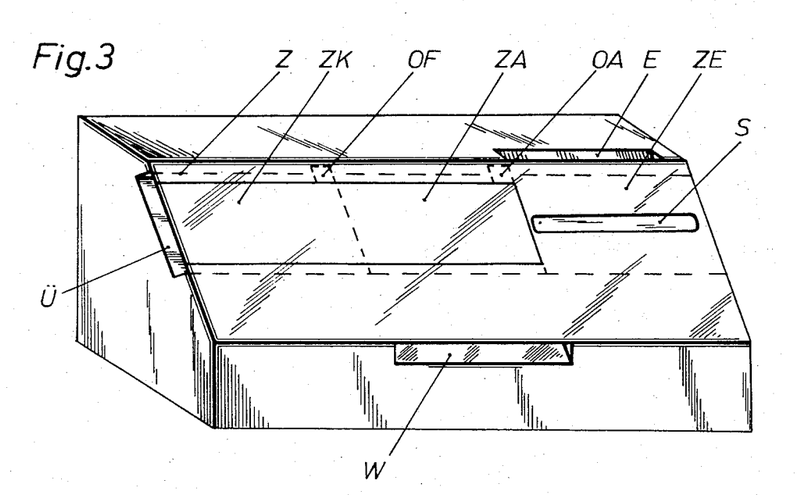
FIG. 3 illustrates a somewhat simplified perspective front view of a first embodiment of the evaluating apparatus according to the invention.
Figure 4:
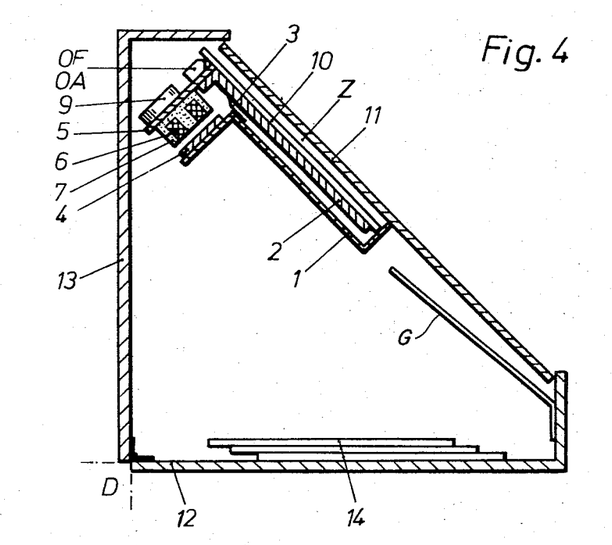
FIG. 4 illustrates a sectional view through the apparatus according to FIG. 3 and showing the means for collecting a correctly answered question data carrier.

FIG. 3 illustrates the evaluating apparatus according to the invention comprising a feed-in slot E for the insertion of the question and answer cards. An intermediate storage area Z is provided on the front face of the housing of the apparatus. The front face is inclined at an angle of about 45° relative to the horizontal. The intermediate storage Z is covered by a viewing window 11 (FIG. 4). Further, the intermediate storage Z is divided into three areas; namely, the insertion area ZE, the discharge area ZA and the collecting area ZK. The intermediate storage Z is provided with a flat surface along which the question and answer cards may be pushed in contact with each other. For this purpose, the insertion area ZE is provided with a slot S whereby the cards may be moved manually from right to left, for example by inserting the eraser end of a pencil. The optical scanning devices OA and OF are spaced from each other as shown, whereby the scanning device OF scans the question card whereas the scanning device OA scans the answer card.

A discharge chute G (FIG. 4) extends toward a discharge slot W for the discharge of the answer cards when the answer was correct. The left-hand end of the intermediate storage Z is provided with an outlet U for the discharge of the question and answer cards when the answer was wrong.

The apparatus so far described operates as follows. First any selected question card will be inserted into the feed-in slot E in the feed-in area ZE of the intermediate storage Z whereby the back surface of the card must face down so that the scanning device may scan the markings. The card is then manually pushed along the intermediate storage Z for example as described above by inserting the eraser end of a pencil into the slot S until the card reaches the discharge area ZA. Thereafter, the answer cards or answer card elements are also inserted into the feed-in slot E again with the markings facing downwardly. Advancing the answer cards as described will move the cards in edge to edge relationship along the sliding surface of the intermediate storage. Thus, when both answer cards have been inserted and pushed to the left, the question card will be in the collection area ZK and the answer cards will be in the discharge area ZA. If the answer has been correct, the evaluating apparatus will signify this fact by an optical and/or an acoustical signal. For example a bulb could be arranged on the front face of the apparatus shown in FIG. 3 below the intermediate storage Z and a buzzer could similarly be arranged. According to the invention the apparatus collects the question card in the collection area ZK, whereas the answer cards in the discharge area ZA are released through the slot W as will be described in more detail below with reference to FIG. 4.

Figure 5:
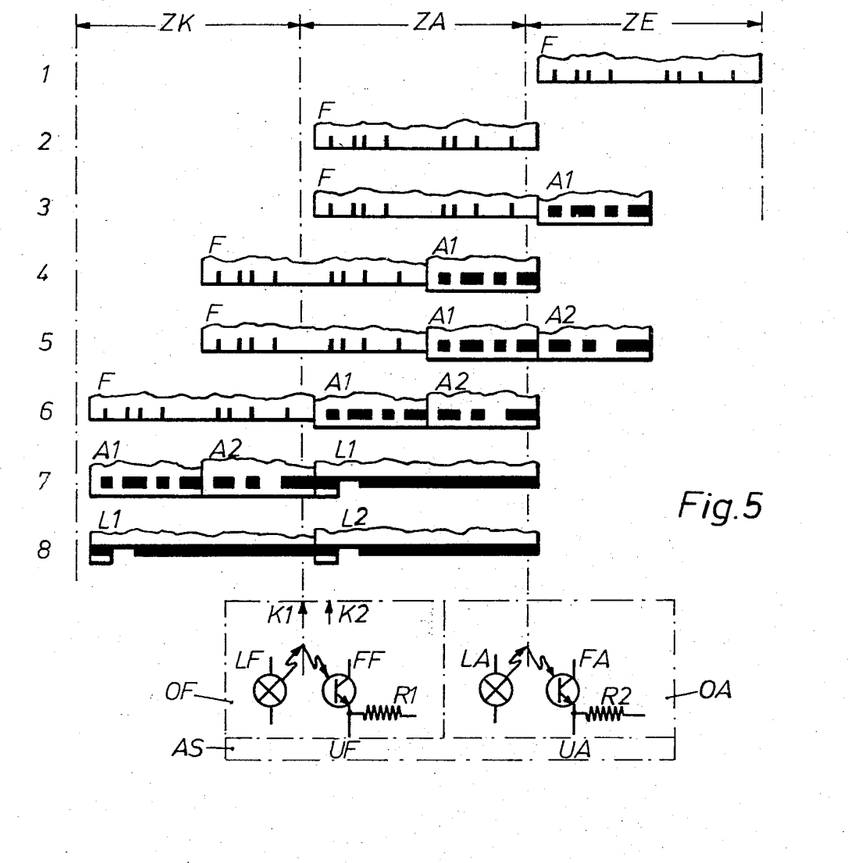
FIG. 5 illustrates with reference to the markings on the data carriers the operation and control function of the evaluating apparatus according to the invention.

When the answer was incorrect the evaluating apparatus will not respond but rather it will be locked or blocked against further operation. The blocked apparatus can be unlocked for further operation only by replacing the question card in the collection areas ZK by a special card which carries special markings and which signifies an error. Such an erasing card or the elements thereof are shown in FIG. 5. These error cards are also inserted into the feed-in slot E whereby the question card in the intermediate storage is pushed out through the discharge outlet U. Similarly, the insertion of a further error or erasing card will assure the discharge of the answer cards through the discharge opening U, whereby simultaneously the first error card is placed into the collection area ZK of the intermediate storage Z. The evaluating apparatus is now unlocked by collecting the error card which thus signifies a wrong answer. At the same time, the second error card is discharged through the discharging opening W.

The blocked evaluating apparatus can be released only by means of the error cards. The insertion of other cards will merely result in the discharge of the cards in the intermediate storage through the outlet U. This feature has the advantage that each question card collected into the receptacle of the apparatus signifies a correctly answered question and that for each wrong answer an error card is collected so that correct and incorrect answers of the student are continuously and completely controlled.

FIG. 4 shows a sectional view through the apparatus according to FIG. 3, whereby the section extends close to the left-hand end of the apparatus. A collecting magnet comprising a coil 6 and a ferrite body 7, is attached to a support plate 2 the top surface of which constitutes the sliding surface of the intermediate storage Z.

An angle member 1 is hinged to the rear surface of the support plate 2 by means of a spring member 3 which normally holds the angle member 1 in the shown position, whereby a closing edge is provided along the lower side of the support plate 2. The upper end of the angle member 1 is provided with an iron yoke 4 facing the magnet 6, 7. The support plate 2 has attached thereto preferably at an angle an insulating carrier plate 5 for example made of epoxy which carries electrical circuit elements 9 and the magnet 6, 7 as well as the optical scanning devices OA and OF. A card 10 which may be a question card or an answer card is located on top of the front surface of the support plate 2 in the intermediate storage Z and thus underneath the viewing window 11. The card 10 is held in this position by the lower end of the angle member 1. However, when the collecting magnet is energized, the angle member 1 will be turned in the clockwise direction away from its shown position, whereby the cards on the support plate are released either into the chute G for discharge through the opening W or they will be collected into the receptacle 12 as shown at 14 in FIG. 4. The rear wall 13 of the receptacle 12 is hinged to the bottom wall by a hinge D and is lockable by conventional means not shown. Thus, the inside of the receptacle which contains the correctly answered question and error cards 14 as well as the above described elements and possibly also batteries is accessible only by means of a key.

FIG. 5 illustrates in a stepwise fashion the control sequence of the present evaluating apparatus. The two optical scanning devices OF and OA comprise a light source LF and LA respectively as well as a photosensitive member such as a phototransistor FF and FA respectively.

The light-dark markings of the cards are illuminated by the light sources and the phototransistors convert the reflected light into a current corresponding to the brightness value of the respective markings. The current causes a voltage drop UF, UA across the resistors R1 and R2 which voltage drops also correspond to the brightness value of the respective markings. By making the dark markings on the question cards narrower than the dark markings on the answer cards, and by suitably dimensioning the two resistors R1 and R2, it is possible to assure that the voltage difference UF-UA is always positive when the cards pass by the scanning devices and as long as the question and answer markings correspond to each other. Further, when the correspondence between the markings is missing the voltage difference UF-UA will become negative. The just described voltage difference (positive for a correct answer, negative for a wrong answer) is evaluated in an evaluating circuit arrangement AS, the details of which are shown in FIG. 6 and which is used to control the collecting magnet 6, 7.

The operational steps will now be described with reference to FIG. 5.

1. Insert the question card F into the feed-in slot E.
2. Slide the question card F into the discharge area ZA of the intermediate storage Z.
3. Insert the first answer card element A1 into the feed-in slot E.
4. Displace the first answer card element A1 to the left into the discharge area ZA, whereby the first half of the question card F is necessarily displaced into the collecting area ZK of the intermediate storage Z. In passing, the question card F closes with its upper edge the electrical contact K1 by means of which the evaluating circuit is switched on. With the movement of the answer card into the discharge area ZA the light-dark markings on the correction and answer cards are optically scanned by the scanning devices OF and OA, whereby they are compared with each other. When the markings do not coincide or rather do not correspond to each other a wrong answer is signified, whereby the collecting magnet 6, 7 is blocked through the evaluating circuit arrangement AS.
5. The second element A2 of the answer card is inserted into the feed-in slot E.
6. The displacement of the second half of the answer card A2 into the discharge area ZA necessarily displaces simultaneously the second half of the question card into the collecting area ZK of the intermediate storage Z. As soon as the last answer card or card element is completely located in the discharge area ZA, it is assured that the question card is completely located in the collecting area ZK. In this instance the upper edge of the answer card A1 which is higher than the respective edge of the question card actuates the electrical contact K2, whereby the collecting step is triggered provided that the collecting magnet 6, 7 has not been blocked as a result of a wrong answer. Thus, the answer card located in the collecting area ZK is collected into the box as described above by the tilting of the angle member 1 and the two elements of the answer cards A1, A2 are released for further use through the chute G and the discharge opening W. If the answer was wrong, the collecting magnet was blocked and the question and answer cards remain in the intermediate storage. The apparatus must now be released by means of a special erasing or error card L, the upper edge of which is provided with predetermined notches for the actuation of the contacts K1, K2.
7. The insertion of an error card L1 into the insertion area ZE and shifting of the error card to the left into the discharge area ZA takes place in the same manner as described with regard to the other cards. The question card F will thus be discharged through the overflow opening U and the answer cards A1 and A2 are shifted into the collecting area ZK.
8. A second error card L2 is inserted and displaced into the discharge area ZA, whereby simultaneously the first error card L1 is displaced into the collecting area ZK. Thus, the first error card L1 actuates the contact K1 of the evaluating apparatus whereas the second error card L2 actuates the contact K2 for energizing the collecting magnet 6, 7. As a result, the first error card L1 in the collecting area ZK is collected into the receptacle 12 and a second error card L2 is discharged from the discharge area ZA for further use. In this manner the error is recorded through the collection of the first error card L1 and the second error card L2 is made available for further use. Simultaneously, the evaluating apparatus is unlocked for further operation.

Figure 6:
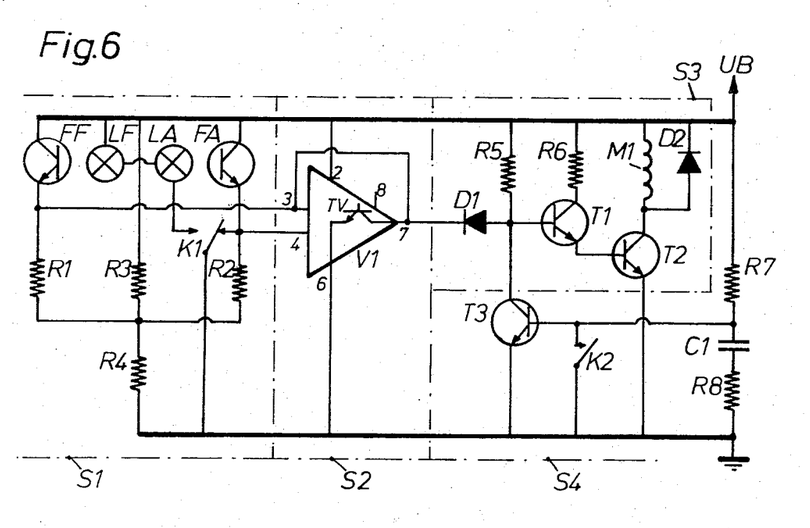
FIG. 6 shows an electrical circuit diagram of the evaluating device.

FIG. 6 illustrates the electrical circuit arrangement of the evaluating circuit AS comprising the sensing circuit S1 for the two scanning devices, the amplifier stage S2 and the control stage S3 for the collecting magnet and the release or unlocking circuit S4. Prior to operation of the apparatus, the differential amplifier V1 is reset by the contact K1 connecting the input 4 to ground. After the insertion of the question card and the first answer card element A1, the contact K1 is actuated to energize the light sources LF, LA and to release the amplifier V1. The two phototransistors FF and FA are controlled by the light reflected from the light and dark markings on the question or answer cards in such a manner that the differential amplifier V1 will always receive a positive voltage (UF > UA) at its inputs as long as the question and answer markings correspond to each other. The output transistor TV will remain non-conductive as long as this condition prevails. If the coincidence or correspondence between the question and answer markings should disappear at any time during the comparison, the phototransistors FF, FA will supply to the inputs of the amplifier V1 a negative difference voltage (UF < UA) and the output transistor TV of the amplifier becomes conductive. The transistor TV remains conductive due to the feedback connection between the terminals 7 and 3, in other words, this conductive state is stored even if in the further sequence of the evaluation the input voltage of the amplifier should become positive again. Stated differently, the feedback feature of the amplifier V1 stores the error. However, if the output transistor TV is still non-conductive at the end of a comparison sequence it signifies that all markings of the question and answer card correspond to each other and that the answer has been correct. If the transistor TV is conducting it signifies that at least one marking was wrong and that the answer was respectively wrong. The voltage divider R3-R4 provides the necessary biasing voltage for the amplifier (UV≈≈0.5UB).

The transistor T3 of the release circuit S4 will remain conductive through the resistor R7 as long as the contact K2 has not been actuated, whereby the control transistors T1 and T2 of the collecting magnet M1 remain non-conductive. The magnet M1 shown symbollically in FIG. 6 corresponds to the collecting magnet 6, 7 shown in FIG. 4. Only after the last answer card has entered into the discharge area ZA, that is after the question and answer cards have been completely scanned will the contact K2 be closed by the first answer card whereby the control transistors T1 and T2 of the collecting magnets are released. However, if in the course of an evaluation an error has been detected, the two control transistors T1 and T2 and thus the collecting magnet M1 remains blocked through the diode D1 and through the output transistor TV of the amplifier V1.

If no error has been detected, the two transistors T1 and T2 are controlled to control in turn the magnet M1, whereby the latter is energized and the question card is collected into the receptacle while the answer cards are simultaneously released as has been described above. Simultaneously the lamps LF and LA are switched off through the contact K1 and the contact K2 is opened again.

A timing circuit comprising the resistors R7 and the capacitor C1 is properly dimensioned to prevent that the collecting step is interrupted through the transistor T3. The time constant of this circuit is several seconds to assure the completion of the collecting step, thereafter the transistor T3 becomes conductive again to block the collecting magnet through the transistor T1 and T2. The diode D2 connected in parallel to the magnet M1 is provided to block voltage peaks which may occur when the magnet is switched off.

In case of a wrong answer the output transistor TV of the amplifier V1 remains conductive until the circuit arrangement has been released or unlocked by means of two special release or error cards as mentioned above. Due to this state of the circuit arrangement the magnet M1 also remains blocked until an error card L1 inserted into the collecting zone ZK releases the contact K1 thus blocking the output transistor TV of the amplifier V1 whereby the magnet is released. Simultaneously the error card L2 entered into the discharge area ZA actuates the contact K2 whereby the magnet is actuated. As a result, the first error card L1 is collected into the receptacle 12 and the second error card L2 is released for further use. The circuit arrangement is now in condition for further use. The resistor R6 of the control stage S3 limits the control current for the transistor T2. The resistor R8 of the release circuit stage S4 limits the discharge current of the capacitor C2 for the contact K2.

Figure 7:
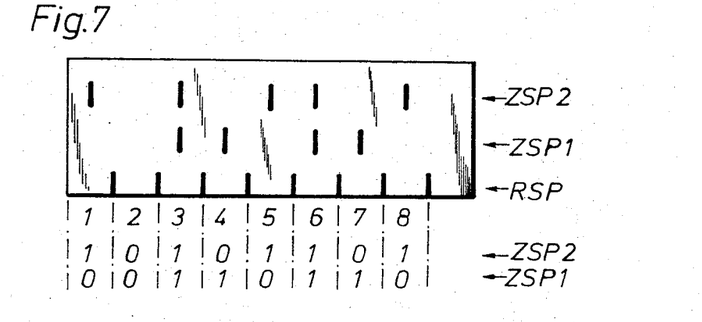
FIG. 7 shows the rear surface of a question data carrier such as a card on which the markings are arranged for use in an evaluating apparatus according to the second embodiment of the invention.

Another embodiment of the invention employing answering means in the form of a keyboard will now be described with reference to FIGS. 7 and 8. FIG. 7 illustrates the back surface of a question card which is marked with 16 binary areas. A sequence or symbol row RSP comprising eight dark markings forms a column raster with eight columns numbered 1 to 8 as shown. Within these columns 1 to 8 there are provided $m = 2$ symbol rows ZSP1 and ZSP2 each carrying respective markings, wherein the binary symbol 1 is represented by a dark marking and the binary symbol 0 is represented by a light marking as shown in FIG. 7. Thus, it will be appreciated that this question card comprises the markings for answers which may include up to four digits and involving up to 16 different answering symbols.

Figure 8:
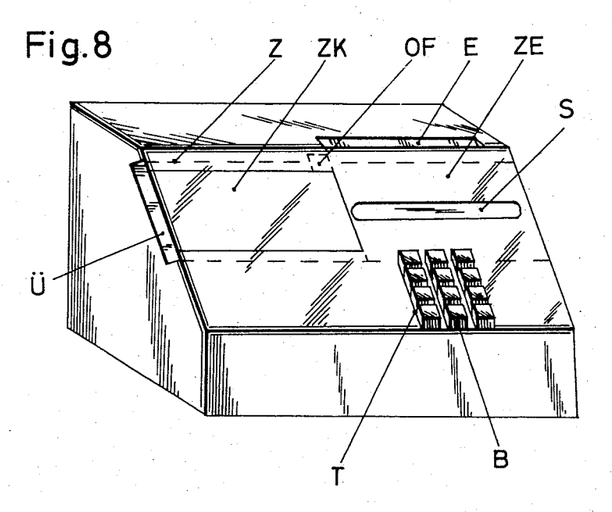
FIG. 8 shows a front view similar to that of FIG. 3, however, illustrating the second embodiment of the evaluating apparatus with a keyboard including answering keys.

FIG. 8 illustrates the evaluating apparatus of the second embodiment according to the invention. The external appearance of the apparatus is similar to that of FIG. 3 and the same elements are designated by the same reference numerals. However, the discharge area ZA is omitted so that the optical scanning device OF is now located directly adjacent to the interface between the collecting area and the feed-in area. The discharge opening W and the second optical scanning device OA are also omitted. Instead, the second embodiment provides a keyboard T including a release key B.

After the insertion of a question card as shown in FIG. 7 into the feed-in slot E of the apparatus according to FIG. 8 and manually shifting the card into the collecting area ZK the answer is given by actuating the respective keys in the keyboard T and the evaluating sequence is triggered by actuating the evaluating key B. The collecting of a question card in response to a correct answer and the blocking as well as the releasing of the evaluating apparatus in response to a wrong answer are accomplished in the same manner as described above in connection with the first embodiment. It should be noted here that the comparison of the question signals resulting from the scanning of the question card shown in FIG. 7 with the answer signals resulting from the actuation of the respective keys in the keyboard T may be accomplished by logic circuit elements which as such as well known. For example, a plurality of coincidence gates could be connected on the one hand to the scanning means and on the other hand to the keys of the keyboard T. Memory elements would have to be employed for temporarily storing the scanned signals. The temporary storing of the signal resulting from the actuation of the keys in the keyboard could be accomplished by simply locking the keys in the actuated position.

It will be appreciated that the arrangement described with reference to the first embodiment is especially simple and inexpensive because due to the sequential operation of the comparison only one scanning device is required for the $i \times n$ markings on the question data carrier and one scanning device for the $i \times n$ markings on the answer data carrier. In other words, due to the series operation single digit scanning devices may be employed. With regard to the second embodiment it is an advantage that the use of keyboards instead of the answer data carriers simplifies the giving of an answer involving a plurality of digits. Thus, especially calculating problems can be solved faster and simpler and this embodiment is especially suitable for older students. Instead of the keyboard it would be possible, especially for the solution of calculation problems to use rotary coding switches.

The question cards for the second embodiment comprise also $i \times n$ optically scanning markings. These markings are arranged in $m$ character lines or channels which in turn are arranged in $(i \times n)/m$ columns and which in accordance with a binary expression are dark or light. An additional raster channel forms a column raster by means of at least $(i \times n)/m$ markings. The optical scanning device must be capable of scanning the $1 + m$ marking channels or rows. The question data carrier as shown in FIG. 7 is moved past the scanning device in such a manner that all $m$ marking areas of a column are scanned simultaneously and that all $(i \times n)m$ columns pass the scanning device in sequence, whereby the $i \times n$ binary signals are registered and held in an intermediate storage for the comparison as mentioned above. The intermediate storage could be, for instance, a plurality of sample and hold circuits. This embodiment has the advantage that for the scanning of the $(i \times n)/m$ columns of the question data carrier a one digit scanning device is sufficient. This reduces the expense for the evaluating apparatus.

The data carrier means in the form of the question data carrier cards and the answer data carrier cards are preferably made of stiff cardboard. However, tablets or even blocks of wood or plastic material may also be used. Further, the carriers may be exchangeably held in respective frames. As mentioned, the preferred data carriers are cards with optical markings because these markings may be produced at relatively low cost by well known printing procedures.

Although the invention has been described in connection with optical markings on the data carriers, it will be appreciated that these markings may also be provided in different forms for example magnetic markings could be used which would preferably be altogether invisible whereby magnetic pick-up heads would be provided in the evaluating apparatus. Electrical markings could also be provided, whereby electrically conductive zones would be interrupted by insulating zones and the scanning would be accomplished by respective contacts. It is also possible to employ mechanical markings such as punched holes or notches, whereby the scanning would be accomplished by electrical scanning contacts or by optical scanning means.

The scanning could be accomplished in parallel fashion, that is simultaneously or in serial fashion, that is, sequentially or these types of scanning could be combined as in the case in the above described second embodiment, wherein the $m$ markings of the column are scanned simultaneously and wherein the $(i \times n)/m$ columns are scanned sequentially. The serial scanning has the advantage that the data carrier may be advanced manually past the scanning device and that relatively simple scanning devices may be employed.

As mentioned above, it is possible to also employ optical and/or acoustical signalling devices for signifying a correct answer to the student. Further, it is possible to combine the evaluating apparatus with means for the dispensing of rewards as a function of correctly answered questions or preferably sets of questions. Further, it is possible to link a number of the present games to a counting apparatus such as an electrical counter so that the group of linked devices could be used in a competition with another similarly linked group of evaluating devices. The wrong answers could also be counted via an electrical counter or the receptacle 12 could be divided into two separate compartments whereby the collection of the cards would be modified to move the angle member 1 to different extends depending on a correct or incorrect answer, whereby the cards would be deposited in one or the other compartment. However, the described use of a special error card keeps the overall arrangement simple and thus less expensive.

In view of the foregoing, it will be appreciated that the invention has removed the drawbacks of the known question and answer games. Due to the storage features of the evaluating apparatus it makes an unsupervised teaching possible. The present apparatus provides a record of the students performance by showing which questions have been answered correctly, namely those for which the respective question card has been collected in the receptacle 12, which questions have not been solved at all, namely those for which the respective cards have not been collected, and how many times a wrong answer was given as represented by the number of the stored error cards. Thus, even the unsupervised student can show his performance after the completion of a task. Further, the collection of the correctly answered question cards especially if combined with a signal signifying the correct answer conveys to the student a sense of success. Another advantage is seen in that the student is not bound to a rigid question sequence. To the contrary he can select any sequence convenient to the student and the selection may be made out of a substantially unlimited number of questions. Furthermore, the collection of the correctly answered question cards makes it possible to intermix easy with difficult questions and to provide these cards with respective evaluating criteria which facilitate the subsequent allocation of a grade to the student's work. Another advantage is seen in that the almost unlimited number of questions permits to tailor different questions for each student thus eliminating cheating where large groups of students must be tested without supervision. The present apparatus further substantially eliminates the finding of an answer by the trial and error method due to the large number of possible answer combinations, in other words the present apparatus provides substantial proof that actual mental work has been performed. For example, the number of possible answer combinations may correspond to $2^i \times {}^n$ if each marking corresponds to a binary symbol.

Although the invention has been described with reference to specific example embodiments, it is to be understood, that it is intended to cover all modifications and equivalents within the scope of the appended claims.

What is claimed is:

1. A programmable question and answer game for answering random questions, wherein the answer may include $i$ elements or digits, comprising a lockable storage receptacle, programmable question data carrier means each of which is provided with at least $i \times n$ markings wherein $i$ is said number of answer elements or digits and wherein $n$ is a random number, scanning means for sensing said markings on said question data carrier means, answering means, evaluating means arranged for cooperation with said scanning means and with said answering means to compare said $i \times n$ markings of the question data carrier means with said answering means, access means to said storage receptacle operatively connected to said evaluating means for receiving a question data carrier means into said receptacle in response to a correct answer, and means responsive to an incorrect answer for storing an error, said answering means comprising a further scanning means and programmable answer data carrier means each including $i$ elements, each of said answer data carrying elements being provided at least with $n$ markings whereby $i \times n$ markings on the question data carrier are correlated with the $n$ markings on said $i$ number of answer data carrying elements.

2. The game according to claim 1, wherein said markings on said question data carrier means are coded and thus meaningless to a player.

3. The game according to claim 1, wherein said markings on said question data carrier means are invisible to a player.

4. A data carrier for a question and answer game according to claim 1, comprising means signifying a question or answer to a player, and markings as part of said carrier corresponding to said answer or corresponding to an answer to the respective signified question but void of meaning to the player, said markings being capable of being evaluated by said evaluating means.

5. The game according to claim 1, wherein said receptacle comprises receiving means for said question and answer data carrier means, intermediate support means for said question and answer data carrier means arranged for conveying said question data carrier means past said scanning means and said answer data carrier means past said further scanning means, said scanning means and said further scanning means being spaced from each other a predetermined distance and said data carrier means following each other in uninterrupted timed succession whereby the markings on the question data carrier means successively pass the first mentioned scanning means while the markings on the answer data carrier means simultaneously with the scanning of the question data carrier means, successively pass the further scanning means for successively comparing each marking on the question data carrier with the respective marking on the answer data carrier.

6. The game according to claim 1, wherein said question data carrier means and said answer data carrier means comprise cards with optical markings, said scanning means and said further scanning means comprising optical scanning means, each of said $n$ markings on said $i$ answer data carrier cards comprising two adjacent fields one of which carries a dark mark for representing a binary marking sequence comprising $i \times n$ digits, said optical markings on said question data carrier card comprising a respective marking sequence corresponding as to size and digital position to the marking sequence of the answer cards.

7. The game according to claim 6, wherein said optical scanning means are operatively connected to said evaluating means for comparing the brightness of the optical markings on the question data carrier with the brightness of the optical markings on the answer data carrier to produce a difference value, said markings having differing width and said scanning means being dimensioned so that said difference value assumes one magnitude when said comparing signifies a correct answer and another magnitude when said comparing signifies an incorrect answer.

8. The game according to claim 6, wherein said markings on the question data carrier card are narrower than the markings on the answer data carrier cards or vice versa, and wherein said difference value assumes positive or negative values.

9. The game according to claim 1, further comprising answer data carrier means, said question and answer data carrier means comprising a mangetizable marking zone and invisible magnetized markings in said zone.

10. The game according to claim 1, further comprising answer data carrier means, said question and answer data carrier means comprising an electrically conductive marking zone and electrically insulating markings in said zone.

11. The game according to claim 1, further comprising answer data carrier means, said question and answer data carrier means comprising mechanical markings.

12. The game according to claim 1, wherein said means responsive to an incorrect answer for storing an error comprise means for locking said access means in response to a wrong answer, and an error data carrier for again unlocking said acces means whereby said error data carrier is received into said receptacle as an error indication.

13. The game according to claim 1, wherein said means responsive to an incorrect answer comprise a second storage receptacle, and means for controlling said access means in response to an incorrect answer to guide said question data carrier into said second storage receptacle.

14. The game according to claim 1, wherein said answering means comprise a keyboard including up to $2^n$ keys for signifying a respective number of answering symbols whereby $n$ corresponds to said random number, and wherein said evaluating means comprise means for comparing any combinations of actuated keys signifying an $i$-digit answer with said $i \times n$ markings on the question data carrier.

15. The game according to claim 14, wherein said question data carrier means comprises cards with $i \times n$ optically scannable marking zones arranged in $m$ symbol rows each row including $(i \times n)/m$ columns, said marking zones carrying binary dark and light markings, an additional symbol row of raster markings on said question data carrier, whereby the raster markings designate respective columns in a raster including at least $(i \times n)/m$ markings and whereby a total of $m + 1$ symbol rows are provided on said question data carrier, said scanning means comprising optical scanning means for said $m + 1$ marking rows, means for moving said question data carrier past said optical scanning means so that all $m$ marking zones of a column pass said scanning means simultaneously, whereas all $(i \times n)/m$ columns pass the scanning means successively, intermediate storage means operatively connected to said scanning means for registering all $i \times n$ binary markings, and comparing means connected to said intermediate storage means and to said keys for comparing the question with the answer.

* * * * *